(12) United States Patent
Tedesco et al.

(10) Patent No.: US 7,677,368 B2
(45) Date of Patent: Mar. 16, 2010

(54) APPARATUS FOR CONTROLLING THE CONING IN A BRAKE ROTOR

(75) Inventors: Marcello Tedesco, Saline, MI (US); Michael Dunn, Canton, MI (US); John Frait, Ann Arbor, MI (US)

(73) Assignee: Brembo S.p.A. (IT)

( * ) Notice: Subject to any disclaimer, the term of this patent is extended or adjusted under 35 U.S.C. 154(b) by 929 days.

(21) Appl. No.: 10/861,093

(22) Filed: Jun. 4, 2004

(65) Prior Publication Data

US 2005/0269173 A1 Dec. 8, 2005

(51) Int. Cl.
F16D 65/12 (2006.01)

(52) U.S. Cl. .............................. 188/218 XL; 188/18 A

(58) Field of Classification Search ........... 188/218 XL, 188/18 A, 264 AA; 301/6.8
See application file for complete search history.

(56) References Cited

U.S. PATENT DOCUMENTS

| | | | |
|---|---|---|---|
| 2,380,085 A * | 7/1945 | Tack et al. ............ 188/218 XL |
| 2,423,056 A | 6/1947 | Tarbox |
| 2,451,709 A | 10/1948 | Baselt |
| 2,485,082 A | 10/1949 | Bachman et al. |
| 2,627,325 A | 2/1953 | Helsten |
| 2,745,518 A | 5/1956 | Bachman |
| 2,753,959 A | 7/1956 | Johnson |
| 2,765,881 A | 10/1956 | Pierce |
| 2,769,512 A | 11/1956 | Tack |
| 3,295,641 A | 1/1967 | Eaton et al. |
| 3,378,114 A | 4/1968 | Hollins |
| 3,394,780 A * | 7/1968 | Hodkinson ............ 188/218 XL |
| 4,002,227 A | 1/1977 | Simon |
| 4,018,311 A | 4/1977 | Tickle |
| 4,077,501 A | 3/1978 | Morris |
| 4,083,435 A | 4/1978 | Gallus et al. |
| 4,281,745 A | 8/1981 | Wirth |
| 4,501,346 A | 2/1985 | Bogenschutz |
| 4,523,666 A | 6/1985 | Murray |
| 4,651,851 A * | 3/1987 | Latvala et al. ......... 188/218 XL |
| 4,679,665 A | 7/1987 | Smith |
| 4,903,801 A | 2/1990 | Kobelt |
| 4,913,266 A | 4/1990 | Russell et al. |
| 5,004,078 A | 4/1991 | Oono et al. |
| 5,544,726 A | 8/1996 | Topouzian et al. |
| 5,810,123 A | 9/1998 | Giorgetti et al. |
| 6,053,290 A * | 4/2000 | Goddard .................. 73/861.73 |
| 6,119,820 A | 9/2000 | Steptoe et al. |

(Continued)

FOREIGN PATENT DOCUMENTS

DE 4233525 4/1994

(Continued)

Primary Examiner—Bradley T King
(74) Attorney, Agent, or Firm—Marshall & Melhorn, LLC

(57) ABSTRACT

An apparatus for controlling the coning in a brake rotor in which the brake rotor comprises a central rotor portion, a first set of mounting members connected to the central rotor portion and an inboard friction section and a second set of mounting members connected to the central rotor portion and an outboard friction section where the inboard and outboard friction sections are connected by a plurality of air directing structures. A channel comprising the first set of mounting members, the second set of mounting member and the plurality of air directing structures is provided.

18 Claims, 3 Drawing Sheets

U.S. PATENT DOCUMENTS

| | | |
|---|---|---|
| 6,164,423 A | 12/2000 | Dickerson |
| 6,216,827 B1 * | 4/2001 | Ichiba et al. .......... 188/218 XL |
| 6,260,669 B1 * | 7/2001 | Daudi ....................... 188/71.6 |
| 6,354,409 B1 | 3/2002 | Ballinger et al. |
| 6,371,250 B1 | 4/2002 | Bunker |

FOREIGN PATENT DOCUMENTS

| | | |
|---|---|---|
| EP | 0508865 | 10/1992 |
| EP | 1088725 | 4/2001 |
| GB | 2093936 | 9/1982 |

\* cited by examiner

APPARATUS FOR CONTROLLING THE CONING IN A BRAKE ROTOR

FIELD OF THE INVENTION

The present invention relates to an apparatus for controlling the coning in a brake rotor.

BACKGROUND OF THE INVENTION

Those skilled in the art know that disc brake assemblies are commonly used for motor vehicles and comprise a rotor and an associated caliper assembly. One or more brake pads of the caliper assembly frictionally interface with the rotation of the rotor to slow its movement. Through the frictional interfacing of the brake pads with the rotor, the kinetic energy of the moving vehicle is converted to heat. The heat within the rotor leads to an unequal distribution of thermal stresses which distort the brake rotor. This process is known as coning. Coning can result in braking roughness and may be a factor that may lead to disc thickness variation.

Prior art rotor designs have attempted to reduce, or prevent, coning with limited success. For example, in U.S. Pat. No. 4,651,851 a brake rotor is provided with a flange attached to a hub assembly. A portion of the flange extends from the hub assembly to an inboard friction section. An outboard friction section is connected to the inboard friction section by a plurality of vanes. The portion of the flange extending from the hub to the inboard friction section is designed to act as a heat sink to offset the tilting of the inboard friction section toward the hub assembly. The described design, however, is problematic since heat induced during braking will increase the outer diameter of the outboard friction section at a greater rate than that of the inboard friction section connected to the heat sink. The result will be that the rotor will cone toward the inboard direction.

In U.S. Pat. No. 6,354,409 a brake rotor is provided having a central portion and an extending portion located at the periphery of the central portion. A friction portion having a first friction plate is attached to the extending portion and a second friction plate is attached to the first friction plate. This design is also problematic since heat induced during braking will increase the temperature of the inboard friction section at a greater rate than that of the outboard friction section connected the heat sink. The result will be that the rotor will cone toward the outboard direction.

In U.S. Pat. No. 5,544,726 a brake rotor is provided comprising a hub portion connected to the inboard and outboard friction surfaces. The inboard and outboard friction surfaces are both connected to the hub with individual solid portions. An air inlet port for the outboard friction surface is axially aligned with an air inlet port for the inboard friction surface to allow air to enter into the rotor. The air inlet ports for both friction surfaces alternate with the solid portions. The disadvantage of this design is that the portions connecting the inboard and outboard friction sections to the hub may be too weak to adequately support the rotor.

SUMMARY OF THE INVENTION

The present invention is directed toward a one-piece brake rotor comprising a central rotor portion, a first set of mounting members connected to an inboard friction section, and a second set of mounting members connected to an outboard friction section. A plurality of air directing structures connect the inboard friction section and the outboard friction section. Preferably, a substantially continuous channel is defined by the first set of mounting members, the second set of mounting members and the plurality of air directing structures.

In a preferred embodiment, mounting members of the first set of mounting members alternate with mounting members of the second set of mounting members for connection to the central rotor portion. Air inlets are located among the mounting members of the first set of mounting members and also the second set of mounting members.

In accordance with the present invention, it has been discovered that the rotor can be designed for neutral coning or for a pre-determined amount of coning in either the inboard or the outboard directions.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
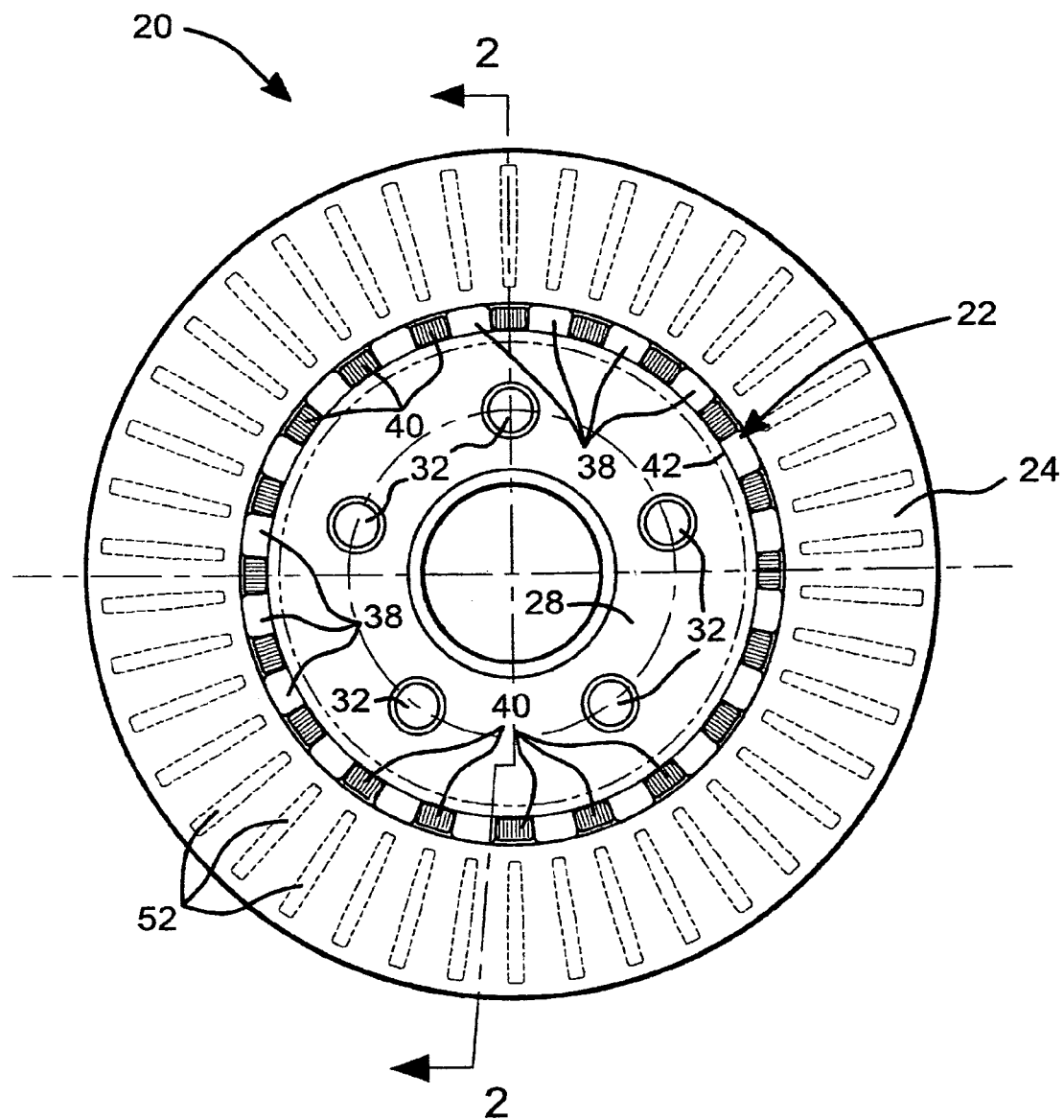
FIG. 1 is a schematic, top view as seen from the inboard side of an embodiment of the present invention.
Figure 2:
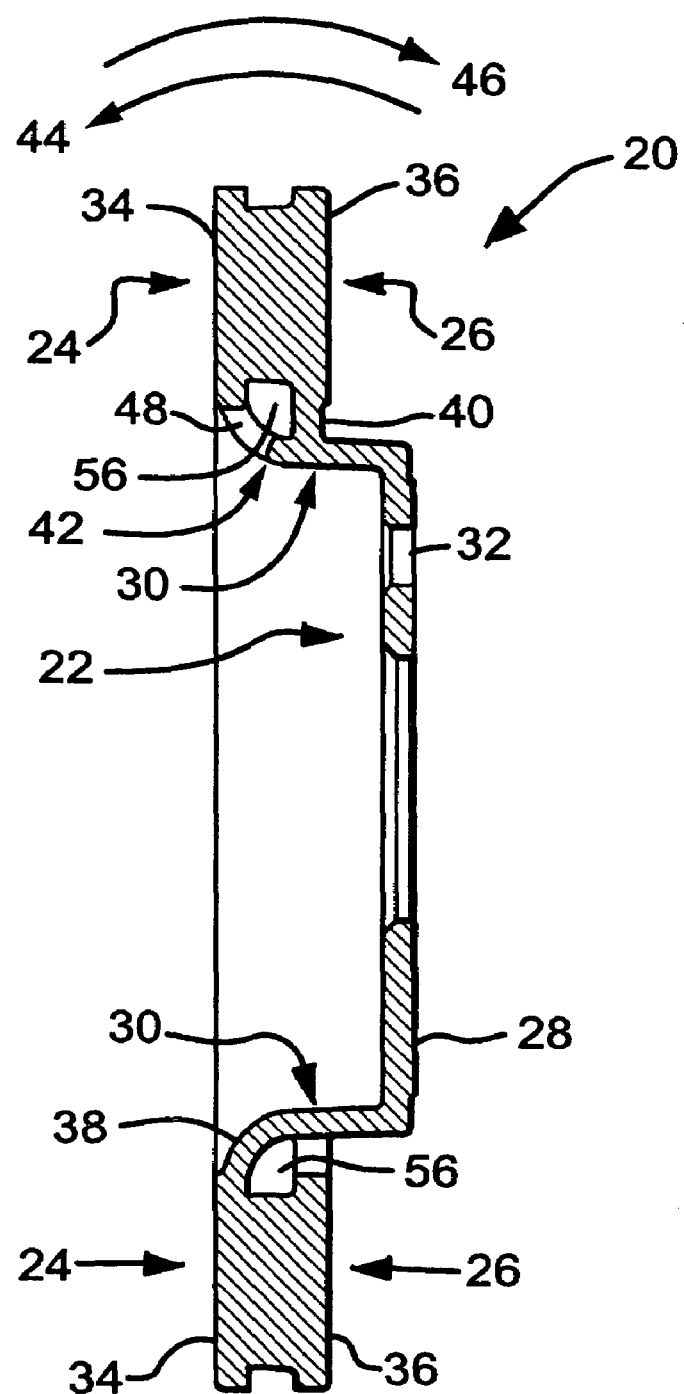
FIG. 2 is a schematic, side view taken along line 2-2 of FIG. 1.
Figure 3:
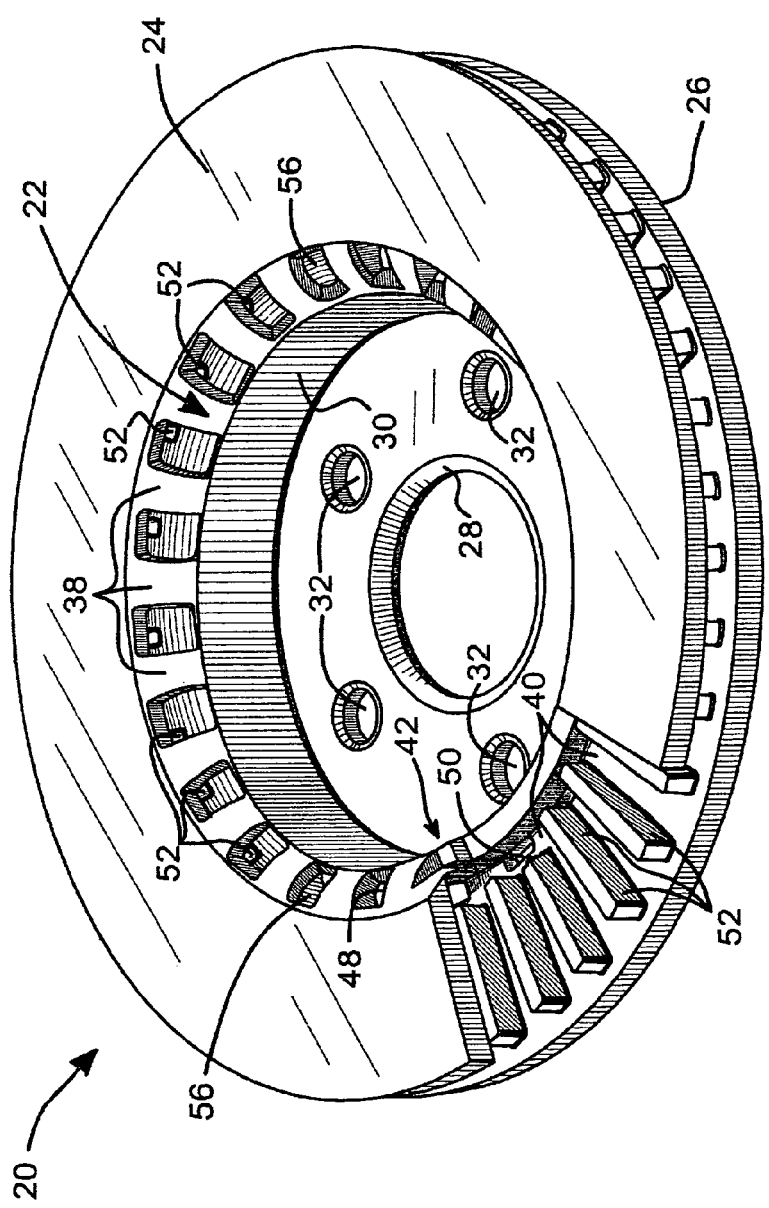
FIG. 3 is a schematic, perspective view of the invention depicted in FIGS. 1 and 2 having a portion removed to reveal a preferred internal structure.

Referring now to FIGS. 1, 2 and 3, a rotor 20 is depicted comprising a central rotor portion 22 connected to an inboard friction section 24 and an outboard friction section 26. The central rotor portion 22, the inboard friction section 24 and the outboard friction section 26 may be individual pieces welded together, or otherwise mechanically attached, but preferably the rotor 20 is a one-piece construction.

The central rotor portion 22 is comprised of a circular plate 28 with a wall 30 extending axially therefrom. The circular plate 28 preferably has a plurality of bolt holes 32 for receiving bolts (not shown) extending from a rotatable hub (not shown).

The inboard friction section 24 and the outboard friction section 26 comprise inboard and outboard rubbing surfaces 34, 36 for frictionally receiving brake pads (not shown). The brake pads are supported by at least one brake caliper (not shown). The caliper selectively moves the brake pads against the inboard and outboard rubbing surfaces 34, 36 to reduce, or prevent, the rotation of the sections 24, 26 relative to the brake pads.

Preferably, a first set of mounting members 38 and a second set of mounting members 40 are connected to the central rotor portion 22. The sets of mounting members 38, 40 may be welded to the central rotor portion 22, however, it is preferred that they are integrally formed with the central rotor portion 22. The sets of mounting members 38, 40 are preferably circumferentially spaced about the central rotor portion 22. In a more preferred embodiment, the sets of mounting members 38, 40 are circumferentially spaced about an edge 42 of the axially extending wall 30. It is well within the scope of the present invention, however, to locate the sets of mounting members 38, 40 anywhere about the axially extending wall 30.

Preferably, individual mounting members of the first set of mounting members 38 alternately extend from the axially extending wall 30 with individual mounting members of the second set of mounting members 40. The present invention, however, includes one or more mounting members of the first set 38 alternately extending from the wall 30 with one or more mounting members of the second set 40.

The preferred embodiments in the figures also depict individual mounting members of the first set of mounting members 38 as having an approximately equal thickness, width, design, volume, density and number as the individual mounting members of the second set of mounting members 40. It is well within the scope of the present invention, however, to vary the thickness, width, design, volume, density and/or number of the mounting members in either, or both, of the first or second set of mounting members 38, 40.

The first and the second sets of mounting members 38, 40 are connected to the inboard friction section 24 and the outboard friction section 26, respectively. Preferably, the first and the second sets of mounting members 38, 40 are integrally formed with the inboard friction section 24 and the outboard friction section 26, respectively. The present invention includes, however, welding, or otherwise mechanically attaching, the first and the second set of mounting members 38, 40 to the inboard friction section 24 and the outboard friction section 26, respectively.

As provided above, the first set of mounting members 38 support the inboard friction section 24 and the second set of mounting members 40 support the outboard friction section 26. A rotor 20 with neutral coning has a first set of mounting members 38 and a second set of mounting members 40 that are substantially similar in their structural rigidity. A substantially similar structural rigidity may be provided through identical first and second sets of mounting members 38, 40, or by varying the thickness, design, volume, spacing, density and/or number of mounting members within one set to match the structural rigidity of the other set of mounting members.

A rotor 20 with a predictable amount of coning is a rotor 20 having the first set of mounting members 38 with one structural rigidity and the second set of mounting members 40 with a second, different structural rigidity. The differing structural rigidity can be achieved by varying the number, spacing, design, density and/or volume of either the first set of mounting members 38 or the second set of mounting members 40.

For example, if the structural rigidity of the first set of mounting members 38 is lessened with respect to the second set of mounting members 40, the rotor 20 will cone in an inboard direction. Conversely, if the structural rigidity of the second set of mounting members 40 is lessened with respect to the first set of mounting members 38, the rotor 20 will cone in an outboard direction. By adjusting the structural rigidity of both sets of mounting members 38, 40, coning in either an inboard direction 44 or an outboard direction 46, as shown in FIG. 2, can be achieved.

In the preferred embodiment, adjacent individual mounting members of the first set of mounting members 38 define at least one air inlet 48 between them. Similarly, adjacent individual mounting members of the second set of mounting members 40 define at least one air inlet 50 between them.

FIG. 3 depicts an air inlet 48 among the first set of mounting members 38 having an approximate width equal to that of the individual mounting members. FIG. 3 also depicts an air inlet 50 among the second set of mounting members 40 having an approximate width equal to that of the individual mounting members. The present invention, however, is not limited to these preferred embodiments. Instead, the present invention includes air inlets for either set of mounting members 38, 40, or both, having any width, dimension or number.

It may be preferable to design one or both sets of the mounting members 38, 40 such that the individual mounting members are of various shapes and the spacing between them varies about the rotor 20. Those skilled in the art will appreciate that such designs may dampen, or eliminate, certain vibrations in the rotor 20. Additionally, the first set of mounting members 38 may have an unequal number of mounting members as compared to the second set of mounting members 40 to improve the dampening characteristics of the rotor 20, as known to those skilled in the art.

The figures of the preferred embodiment also depict the individual air inlets 48 among the first set of mounting members 38 at least partially axially aligned opposite individual mounting members of the second set of mounting members 40. The present invention is not limited to these preferred embodiments, but also includes at least partially axially aligning the individual air inlets 48 of the first set of mounting members 38 with the individual air inlets 50 of the second set of mounting members 40.

In the preferred embodiment, the inboard friction section 24 is connected to the outboard friction section 26 at least through a plurality of air directing structures 52. FIGS. 1 and 3 depict one embodiment of the air directing structures 52. The air directing structures 52 shown in FIGS. 1 and 3 are not intended to be limiting in any way, as the present invention may use any air directing structure design to connect the inboard friction section and the outboard friction section. The present invention also includes varying the spacing, length and number of the air directing structures 52 about the rotor 20, or in selected sections of the rotor 20, to eliminate, or reduce, vibration in the rotor 20 in a manner known to those skilled in the art.

Preferably, a substantially continuous channel 56 is defined by the first set of mounting members 38, the second set of mounting members 40 and the plurality of air directing structures 52. As shown in FIGS. 2 and 3, the channel 56 preferably extends circumferentially adjacent the wall 30. The channel 56 may be of any shape, dimension or design thus, those shown in the preferred embodiments are not limiting in any way.

The present invention also includes forming the rotor to control the amount of coning, if any. It may be desirable to control the amount of coning of the rotor 20 so that it interacts in a particular way with the brake pads when the rotor 20 becomes hot.

Varying one or more of the number, spacing, design and/or volume of one set of mounting members, 38 or 40, can change the structural rigidity of the set of mounting members with respect to the other set of mounting members. If the first set of mounting members 38 are formed to have a lesser structural rigidity as compared to the structural rigidity of the second set of mounting members 40, when the rotor heats up due to braking, the rotor 20 will cone in an inboard direction 44. Conversely, if the first set of mounting members 38 are formed to have a greater structural rigidity as compared to the structural rigidity of the second set of mounting members 40, when the rotor 20 heats up due to braking, the rotor 20 will cone in an outboard direction 46.

By varying the structural rigidity of the first set of mounting member 38 and/or the second set of mounting members 40, the rotor 20 can be predictably coned in either the inboard or outboard direction. Those skilled in the art will also appreciate that the number, spacing, design, density and/or volume of the first and second sets of mounting members 38, 40 can be varied, yet a substantially identical structural rigidity can still be achieved. In this case, the rotor 20 would not cone appreciably in either the inboard 44 or the outboard 46 direction.

In accordance with the provisions of the patent statutes, the present invention has been described in what is considered to represent its preferred embodiments. However, it should be noted that the invention can be practiced otherwise than as specifically illustrated and described without departing from its spirit or scope.

We claim:

1. A brake rotor, comprising:
   a central rotor portion having a circular plate having a wall extending substantially horizontally therefrom;
   a first set of individual mounting members connected to said wall;
   a second set of individual mounting members connected to said wall;
   an inboard friction section connected to said first set of mounting members; and
   an outboard friction section connected to said second set of mounting members, said outboard friction section and said inboard friction section connected at least by a plurality of air directing structures;
   wherein said first set of mounting members has a greater structural rigidity than said second set of mounting members and wherein said central rotor portion, said first set of mounting members, said second set of mounting members, said inboard friction section and said outboard friction section are one-piece and integrally formed.

2. The brake rotor of claim 1, further comprising a substantially continuous channel formed by said first set of mounting members, said second set of mounting members and said plurality of air directing structures, said channel extends circumferentially about said central rotor portion.

3. The brake rotor of claim 1, wherein mounting members of said first set of mounting members alternately extend from said central rotor portion with mounting members of said second set of mounting members.

4. The brake rotor of claim 1, wherein adjacent mounting members of said first set of mounting members define air inlets between them and adjacent mounting members of said second set of mounting members define air inlets between them.

5. The brake rotor of claim 4, wherein said air inlets of said first set of mounting members are at least partially axially aligned opposite said second set of mounting members.

6. A brake rotor, comprising:
   a central rotor portion having a circular plate having a wall extending substantially horizontally therefrom;
   a first set of individual mounting members connected to said wall;
   a second set of individual mounting members connected to said wall;
   an inboard friction section connected to said first set of mounting members; and
   an outboard friction section connected to said second set of mounting members, said outboard friction section and said inboard friction section connected at least by a plurality of air directing structures;
   wherein said first set of mounting members has a lesser structural rigidity than said second set of mounting members and wherein said central rotor portion, said first set of mounting members, said second set of mounting members, said inboard friction section and said outboard friction section are one-piece and integrally formed.

7. The brake rotor of claim 6, further comprising a substantially continuous channel formed by said first set of mounting members, said second set of mounting members and said plurality of air directing structures, said channel extends circumferentially about said central rotor portion.

8. The brake rotor of claim 6, wherein adjacent mounting members of said first set of mounting members define air inlets between them and adjacent mounting members of said second set of mounting members define air inlets between them.

9. The brake rotor of claim 8, wherein said air inlets of said first set of mounting members are at least partially axially aligned opposite said second set of mounting members.

10. The brake rotor of claim 6, wherein mounting members of said first set of mounting members alternately extend from said central rotor portion with mounting members of said second set of mounting members.

11. A brake rotor, comprising:
    a central rotor portion having a circular plate having a wall extending substantially horizontally therefrom;
    a first grouping of individual mounting members, having a first structural rigidity, connected to said wall;
    a second grouping of individual mounting members, having a second structural rigidity different from said first structural rigidity, connected to said wall;
    a first friction section connected to said first grouping of mounting members;
    a second friction section connected to said second grouping of mounting members; and
    a substantially continuous channel formed about said central portion of said rotor;
    wherein said central rotor portion, said first set of mounting members, said second set of mounting members, said inboard friction section and said outboard friction section are one-piece and integrally formed.

12. The brake rotor of claim 11, wherein mounting members of said first grouping of mounting members alternately extend with mounting members of said second grouping of mounting members from said central rotor portion.

13. The brake rotor of claim 11, wherein said substantially continuous channel is formed by said first grouping of mounting members, said second grouping of mounting members and a plurality of air directing structures.

14. The brake rotor of claim 11, wherein said first structural rigidity is greater than said second structural rigidity.

15. The brake rotor of claim 11, wherein said first structural rigidity is less than said second structural rigidity.

16. The brake rotor of claim 11, wherein adjacent mounting members of said first grouping define air inlets between them and adjacent mounting members of said second grouping of mounting members define air inlets between them.

17. The brake rotor of claim 11, wherein said first friction section is an inboard friction section and said second friction section is an outboard friction section and said first structural rigidity is greater than said second structural rigidity to urge at least said outboard friction section in an outboard direction.

18. The brake rotor of claim 11, wherein said first friction section is an inboard friction section and said second friction section is an outboard friction section and said first structural rigidity is less than said second structural rigidity and to urge at least said outboard friction section in an inboard direction.

* * * * *